United States Patent
Horváth et al.

(10) Patent No.: US 10,591,074 B2
(45) Date of Patent: Mar. 17, 2020

(54) SUCTION DAMPENING DEVICE WITH INTERNAL DAMPENING FOR VEHICLE AIR CONDITIONING COMPRESSOR

(71) Applicant: Hanon Systems, Daejeon (KR)

(72) Inventors: Zoltán Horváth, Iszkaszentgyörgy (HU); István Pajor, Székesfehérvár (HU); Dávid Kovács, Iszkaszentgyörgy (HU)

(73) Assignee: HANON SYSTEMS, Daejeon (KR)

( * ) Notice: Subject to any disclaimer, the term of this patent is extended or adjusted under 35 U.S.C. 154(b) by 192 days.

(21) Appl. No.: 15/412,204

(22) Filed: Jan. 23, 2017

(65) Prior Publication Data

US 2018/0022191 A1    Jan. 25, 2018

Related U.S. Application Data

(60) Provisional application No. 62/365,011, filed on Jul. 21, 2016.

(51) Int. Cl.
*F16K 17/04* (2006.01)
*B60H 1/32* (2006.01)
(Continued)

(52) U.S. Cl.
CPC ....... *F16K 17/0433* (2013.01); *B60H 1/3223* (2013.01); *F16K 15/026* (2013.01);
(Continued)

(58) Field of Classification Search
CPC ...... F16F 7/08; F16F 7/09; F16F 7/095; F16F 2222/04; F16K 17/0433; F16K 47/00;
(Continued)

(56) References Cited

U.S. PATENT DOCUMENTS

| 322,084 | A | * | 7/1885 | Wilder | F16K 17/0413 137/535 |
| 1,710,635 | A | * | 4/1929 | Wertz | F16K 15/026 137/220 |

(Continued)

FOREIGN PATENT DOCUMENTS

| DE | 3507221 A1 | 9/1985 |
| JP | 2001289177 A | 10/2001 |

(Continued)

*Primary Examiner* — Mary E McManmon
*Assistant Examiner* — Richard K. Durden
(74) *Attorney, Agent, or Firm* — Shumaker, Loop & Kendrick, LLP; James D. Miller

(57) ABSTRACT

A suction dampening device comprises a housing with an inlet port formed therein and a valve case disposed adjacent the inlet port. The valve case includes at least one opening formed therein. A valve core is slidably disposed within the valve case. A lever having an axis of rotation fixed to a portion of the valve case includes a first lever arm disposed to a first side of the axis of rotation and a second lever arm disposed to a second side of the axis of rotation. The second lever arm abuts an outer circumferential surface of the valve core. A spring element is disposed between the first lever arm and the valve core. The spring element is configured to apply a force to the first lever arm to cause the second lever arm to apply a lateral force to the valve core to dampen vibrations of the spring element.

20 Claims, 6 Drawing Sheets

US 10,591,074 B2

Page 2

(51) Int. Cl.
*F16F 7/08* (2006.01)
*F04C 29/12* (2006.01)
*F16K 15/02* (2006.01)
*B60H 1/00* (2006.01)
*F04B 27/10* (2006.01)
*F04B 27/18* (2006.01)
*F04B 53/00* (2006.01)
*F04B 53/10* (2006.01)
*F04C 18/02* (2006.01)
*F04C 28/18* (2006.01)
*F04C 29/06* (2006.01)

(52) U.S. Cl.
CPC ........ *F16K 17/04* (2013.01); *B60H 2001/006* (2013.01); *F04B 27/10* (2013.01); *F04B 27/18* (2013.01); *F04B 53/001* (2013.01); *F04B 53/10* (2013.01); *F04C 18/0215* (2013.01); *F04C 28/18* (2013.01); *F04C 29/06* (2013.01); *F04C 29/124* (2013.01); *F04C 2240/30* (2013.01); *F16F 7/08* (2013.01); *F16F 2222/04* (2013.01)

(58) Field of Classification Search
CPC ................. F16K 47/02; Y10T 137/785; Y10T 137/7852; Y10T 137/7937
See application file for complete search history.

(56) References Cited

U.S. PATENT DOCUMENTS

| | | | | |
|---|---|---|---|---|
| 1,746,220 A * | 2/1930 | Manning | .................... | F01L 1/46 188/268 |
| 2,139,395 A * | 12/1938 | Walker | ................. | F01P 11/0238 123/41.54 |
| 2,508,010 A * | 5/1950 | Bower | ................. | F25B 41/062 137/495 |
| 3,421,547 A * | 1/1969 | Aslan | .................... | F16K 15/044 137/539 |
| 3,524,469 A * | 8/1970 | Jebe | ....................... | F16K 15/026 137/543.19 |
| 4,542,852 A * | 9/1985 | Orth | ....................... | F25B 41/062 188/381 |
| 6,257,848 B1 * | 7/2001 | Terauchi | ................ | F04B 49/225 417/307 |
| 6,729,347 B2 * | 5/2004 | Ittlinger | ................ | F16K 15/026 137/538 |
| 7,581,560 B2 * | 9/2009 | Koch | .................... | F16K 15/026 137/543.19 |
| 8,281,804 B2 * | 10/2012 | Lin | ........................ | F16K 15/063 137/514.5 |
| 8,757,199 B2 * | 6/2014 | Chen | .................... | G05D 16/0669 137/505 |
| 2004/0062660 A1 * | 4/2004 | Kazahaya | ............ | F04B 27/1804 417/222.1 |
| 2006/0021658 A1 * | 2/2006 | Caleffi | .................... | F16K 17/30 137/514.3 |
| 2010/0294972 A1 * | 11/2010 | Park | ....................... | F16K 15/026 251/337 |
| 2011/0076171 A1 * | 3/2011 | Park | .................... | F04B 27/1018 417/571 |
| 2014/0311596 A1 | 10/2014 | Kim et al. | | |

FOREIGN PATENT DOCUMENTS

| KR | 100940820 B1 | 2/2010 |
|---|---|---|
| KR | 20130092879 A | 8/2013 |
| KR | 200470033 Y1 | 11/2013 |
| KR | 1020140025909 A | 3/2014 |
| KR | 1020150004595 A | 1/2015 |
| KR | 1020150031143 A | 3/2015 |
| KR | 1020150033062 A | 4/2015 |
| KR | 20150081785 A | 7/2015 |
| KR | 20150084622 A | 7/2015 |

* cited by examiner

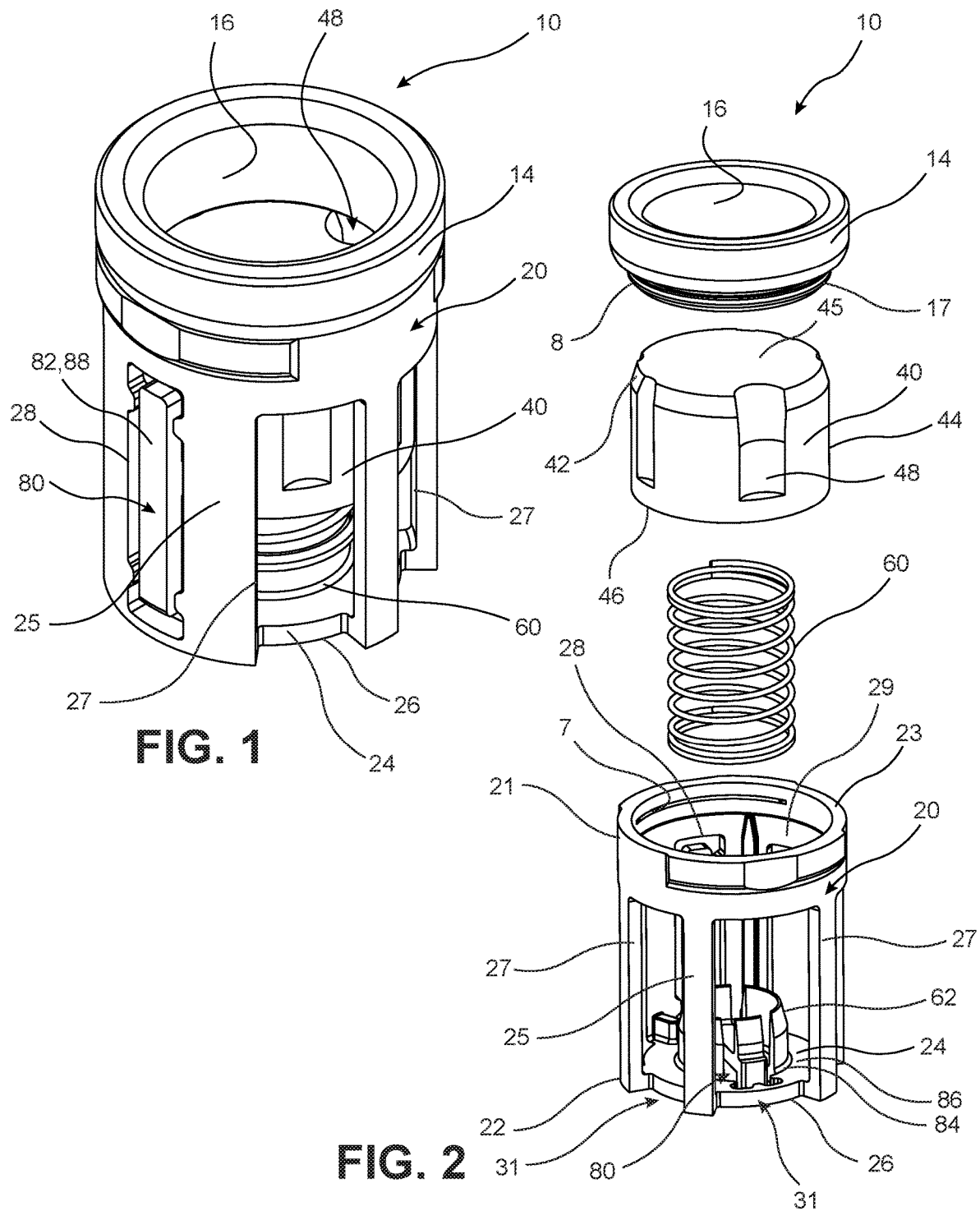

SUCTION DAMPENING DEVICE WITH INTERNAL DAMPENING FOR VEHICLE AIR CONDITIONING COMPRESSOR

CROSS-REFERENCE TO RELATED APPLICATION

This patent application claims priority to U.S. Provisional Application Ser. No. 62/365,011 filed Jul. 21, 2016, the entire disclosure of which is hereby incorporated herein by reference.

FIELD OF THE INVENTION

The invention relates to a compressor for an air conditioning system in a motor vehicle, and more specifically to a dampening device for attenuating vibration and noise within an inlet port of the compressor.

BACKGROUND OF THE INVENTION

Various compressors for use in an air conditioning system of a motor vehicle are known in the art. One such compressor includes a variable displacement compressor. The variable displacement compressor generally includes a swash plate disposed at a variable angle and at least one piston disposed in a cylinder. Each piston engages the swash plate so the angle of the swash plate as it is rotated relative to the at least one piston causes the piston to reciprocate within the cylinder. Each of the cylinders contains a refrigerant in gaseous form that is compressed by the piston within the cylinder during the rotation of the swash plate.

Many variable displacement compressors include a suction dampening device (SDD) within an inlet port of the variable displacement compressor. The SDD is configured to allow a flow of the refrigerant into the compressor while preventing the formation of vibration that may propagate throughout the remainder of the air conditioning system. The SDD typically includes a casing disposed within the inlet port, a core disposed within the casing and configured to move axially within the casing, and a spring disposed between the casing and the core that is in a pre-stressed condition such as normally compressed between the core and at least a portion of the casing, for example. A flow of the refrigerant through the inlet port causes the core to move in a direction further compressing the spring to open an orifice into the compressor, through which the refrigerant flows. Under some circumstances, the flow of the refrigerant into the inlet port may form turbulence causing the spring of the SDD to oscillate. The oscillations, especially when at a resonant frequency of the SDD, may cause vibration within the compressor to propagate throughout the air conditioning system. When the vibration reaches certain components of the air conditioning system such as the evaporator, for example, the vibration may cause undesirable noise to be generated that can be heard in a passenger compartment of the vehicle. Accordingly, the SDD typically includes a dampening feature configured to dampen the oscillating of the spring in order to prevent the incidence of noise propagation throughout the air conditioning system.

In one example, the dampening feature includes the spring of the SDD disposed at an angle with respect to a longitudinal axis of the SDD. The angled relationship causes at least a portion of the spring force to urge the core in a lateral direction against the casing, thereby forming a frictional dampening force between the core and the casing. One disadvantage of this solution is the amount of lateral force applied by the spring is dependent on the angle at which the spring is inclined, wherein an increase in the angle of inclination may frustrate normal operation of the SDD related to the opening and the closing of the orifice into the compressor.

Another exemplary SDD includes the inlet port or the casing having an asymmetrical construction such as a recess formed in a portion of an inner circumferential surface thereof. The asymmetry of the inlet port or casing causes the core to be forced in a direction toward a sidewall of the casing to provide a frictional dampening force. One disadvantage of this approach is the amount of sideways force applied to the core is dependent on a flow rate of the refrigerant passing through the casing, hence the effectiveness of the dampening effect of the SDD is minimized when the compressor is operated to have a minimized flow rate through the compressor.

It would therefore be desirable to produce a suction dampening device that efficiently minimizes noise generation in an air conditioning system independent of a flow rate of the refrigerant passing through the air conditioning system.

SUMMARY OF THE INVENTION

Compatible and attuned with the present invention, a suction dampening device for use in a compressor that minimizes noise generation by providing a frictional dampening force has surprisingly been discovered.

In one embodiment of the invention, a suction dampening device for use in a compressor comprises a valve case including a circumferentially extending sidewall having an inner surface, a valve core having an outer surface slidably engaging the inner surface of the sidewall, a lever including a first lever arm and a second lever arm formed on opposing sides of an axis of rotation thereof, at least a portion of the second lever arm frictionally engaging the outer surface of the valve core, and a spring element disposed between the first lever arm and the valve core. The spring element is configured to urge the first lever arm in an axial direction of the valve case to cause the at least a portion of the second lever arm to apply a force to the outer surface of the valve core.

In another embodiment of the invention, a compressor comprises a housing including an inlet for receiving a flow of a refrigerant and a suction chamber disposed downstream of the inlet with respect to a flow of the refrigerant, the inlet exposed to a first pressure and the suction chamber exposed to a suction pressure. The compressor further comprises a valve case including a circumferentially extending sidewall having an inner surface, a valve core having an outer surface slidably engaging the inner surface of the sidewall, a first end of the valve core exposed to the first pressure and a second end of the valve core exposed to the suction pressure, a lever including a first lever arm and a second lever arm formed on opposing sides of an axis of rotation thereof, at least a portion of the second lever arm frictionally engaging the outer surface of the valve core, and a spring element disposed between the first lever arm and the valve core, wherein the spring element is configured to urge the first lever arm in an axial direction of the valve case to cause the at least a portion of the second lever arm to apply a force to the outer surface of the valve core.

BRIEF DESCRIPTION OF THE DRAWINGS

The above, as well as other objects and advantages of the invention, will become readily apparent to those skilled in the art from reading the following detailed description of a preferred embodiment of the invention when considered in the light of the accompanying drawing which:

FIG. 1 is a rear perspective view of a suction dampening device according to an embodiment of the invention;

FIG. 2 is an exploded front perspective view of the suction dampening device of FIG. 1;

DETAILED DESCRIPTION OF THE INVENTION

Figure 3:
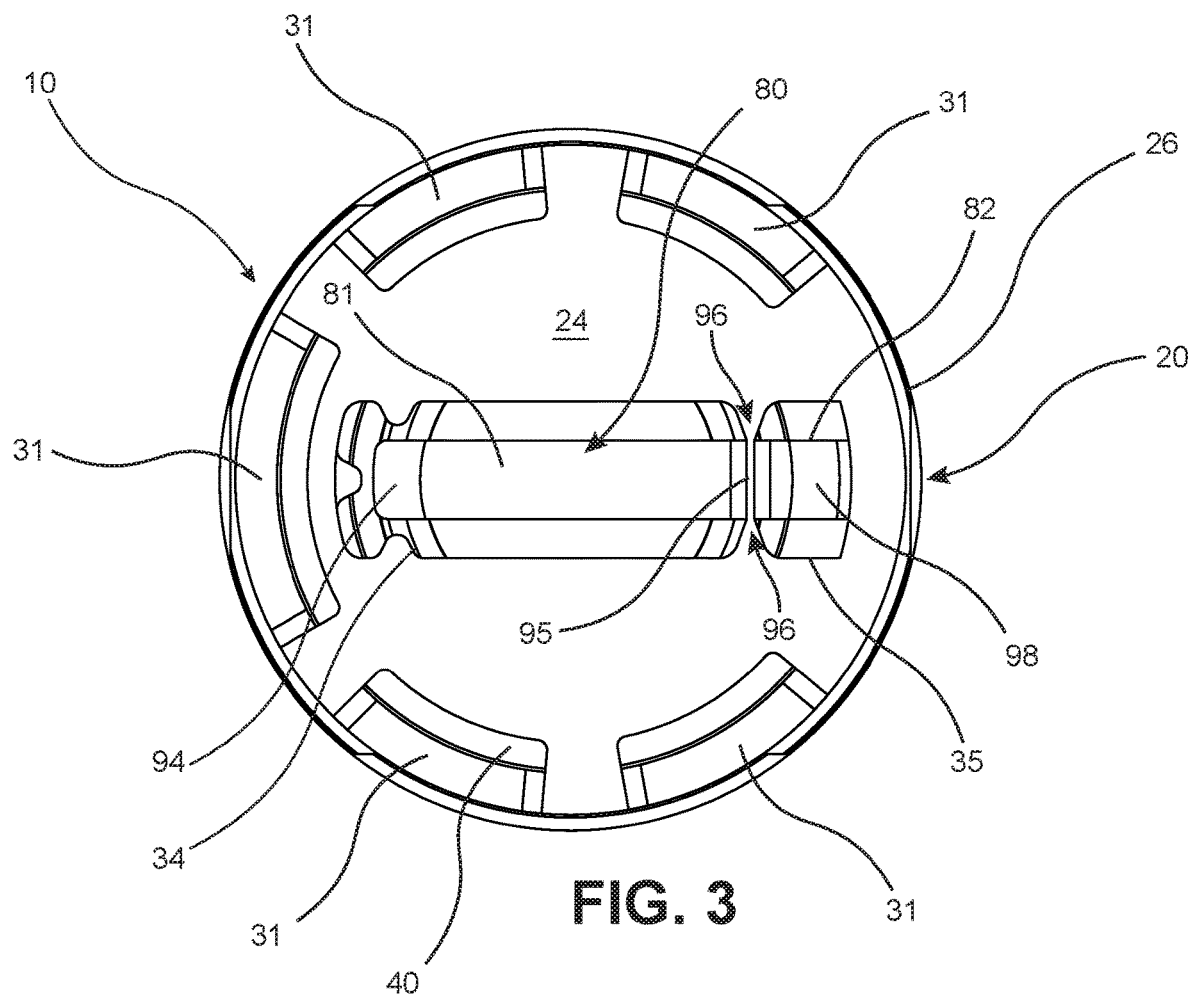
FIG. 3 is a bottom plan view of the suction dampening device of FIG. 1.

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

FIGS. 1-7 illustrate a suction dampening device 10 according to an embodiment of the present invention. The suction dampening device 10 may be adapted for use in a compressor 1 (shown in FIGS. 6 and 7) forming a component of a refrigeration circuit for use in an air conditioning system of a motor vehicle.

The suction dampening device 10 is disposed within a housing 12 of the compressor 1. A portion of the housing 12 defines an inlet port 13 of the compressor 1. The inlet port 13 is in fluid communication with the refrigerant circuit associated with the air conditioning system of the motor vehicle. A pipe or a conduit 11 configured to convey a refrigerant of the air conditioning system is coupled to the inlet port 13. The inlet port 13 may for example be disposed at an end of the conduit 11 downstream of a heat exchanger (not shown) of the refrigerant circuit acting as an evaporator. The inlet port 13 may therefore be configured to receive a flow of a gaseous refrigerant from the conduit 11 to be compressed within the compressor 1 after passing through the suction dampening device 10. The inlet port 13 may be formed in an outermost portion of the housing 12 and may be substantially cylindrical in shape, but alternative shapes and configurations may be used without departing from the scope of the present invention.

Figure 6:
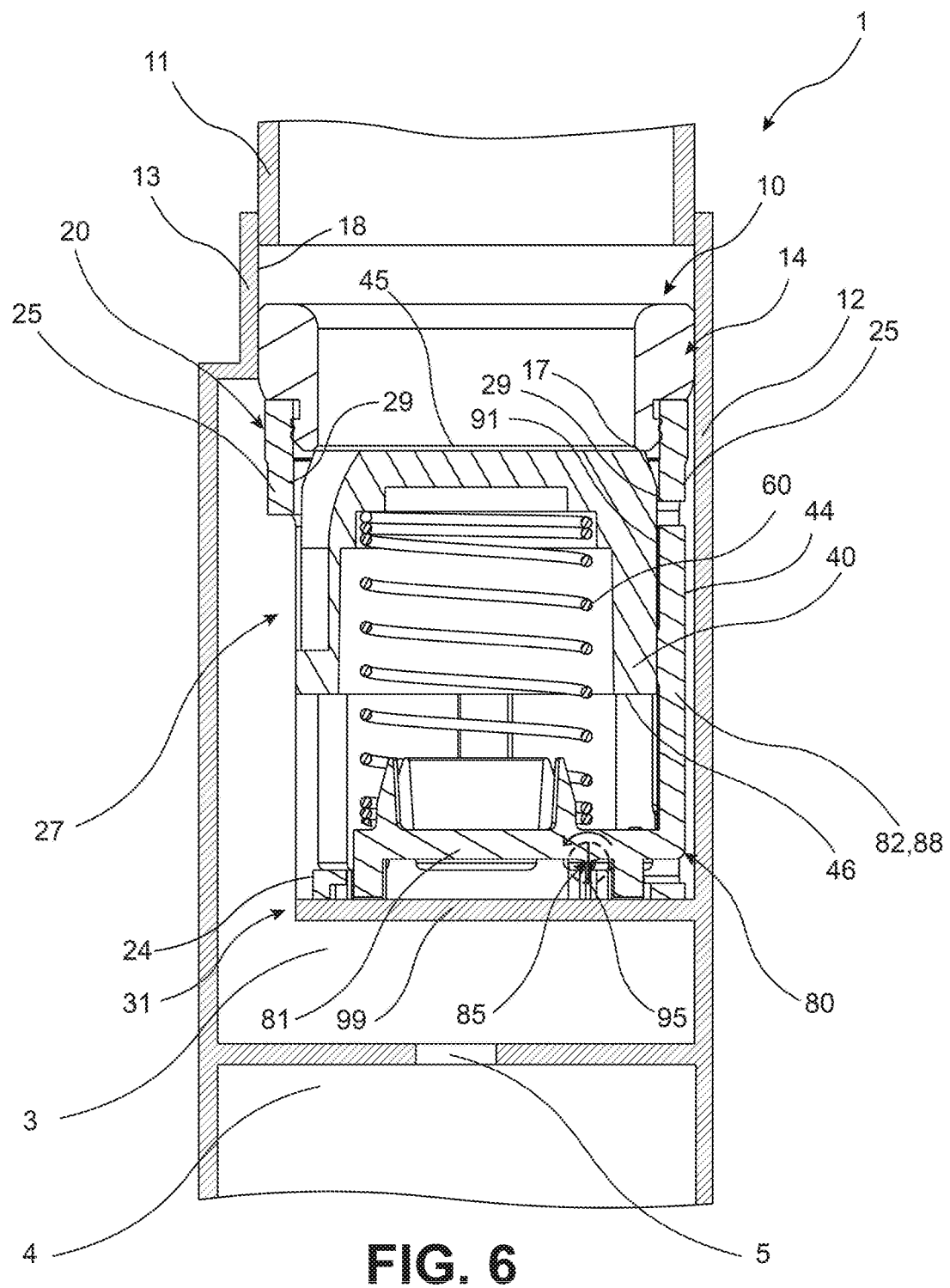
FIG. 6 is a fragmentary cross-sectional side elevational view of a compressor having the suction dampening device disposed therein while in a closed operating state.
Figure 7:
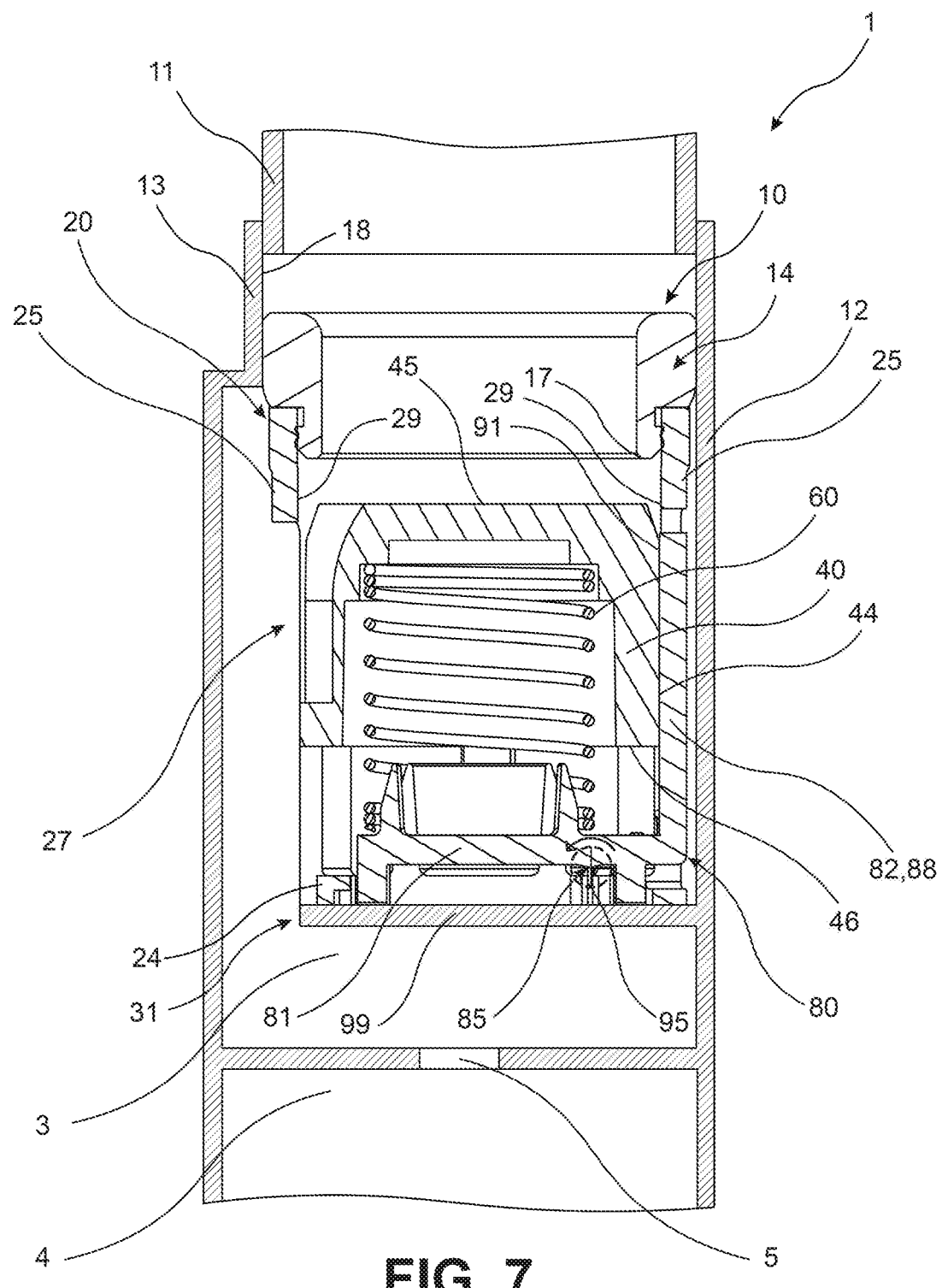
FIG. 7 is a fragmentary cross-sectional side elevational view of the compressor of FIG. 6 while the suction dampening device is in an open operating state.

The housing 12 of the compressor is shown in a generalized form in FIGS. 6 and 7 as the suction dampening device 10 may be adapted for use in any form of compressor wherein a suction pressure is experienced downstream of the suction dampening device 10 and upstream of a compression mechanism of the compressor. The housing 12 is shown as including a suction chamber 3 disposed downstream of the suction dampening device 10, as well as a compression chamber 4 disposed downstream of the suction chamber 3. A valve 5 may be present between the suction chamber 3 and the compression chamber 4 for selectively controlling a flow of the refrigerant into the compression chamber 4 based on an operating status of the compression mechanism. The compression chamber 4 may include any form of compression mechanism therein as is known in the art.

For example, if the compressor 1 is a variable displacement compressor, the compression chamber 4 may include a reciprocating piston used to alternatingly compress the refrigerant within the compression chamber 4 and to then create a suction pressure as the piston is retracted following the expulsion of the compressed refrigerant. The valve 5 may be opened to expose the suction chamber 3 to the suction pressure within the compression chamber 4 during the retraction process, thereby establishing the suction pressure within the suction chamber 3. The opening of the valve 5 then promotes a flow of the refrigerant from the conduit 11 into the compression chamber 4 to prepare the compression chamber 4 for the next iteration of compression of the refrigerant. The suction dampening device 10 may for example be suitable for use in a variable displacement compressor such as is disclosed in Pitla et al. (U.S. Pat. No. 7,014,428), hereby incorporated herein by reference in its entirety. Although the suction dampening device 10 is described hereinafter as being disposed in a variable displacement compressor, it should be understood that the suction dampening device 10 may be utilized with any form of compressor experiencing a pressure difference on opposing sides of the suction dampening device 10 without departing from the scope of the present invention. As one alternative example, the compression chamber 4 may represent a variably sized opening formed between a fixed scroll and an orbiting scroll of a scroll type compressor that is in selective fluid communication with the suction chamber 3, as desired.

As shown in FIGS. 1-5, the suction dampening device 10 generally includes a valve body 14, a valve case 20, a valve core 40, a spring element 60, and a lever 80. The valve body 14 of the suction dampening device 10 is disposed adjacent the inlet port 13 of the housing 12. The valve body 14 may be substantially cylindrical in shape and includes an aperture 16 providing fluid communication between the inlet port 13 and a remainder of the suction dampening device 10. A first end of the valve body 14 defines a valve seat 17. The valve seat 17 is an annular surface for engaging the valve core 40 about at least a portion of a perimeter thereof. The annular surface formed by the valve seat 17 is arranged transversely with respect to an axial direction of the inlet port 13 and/or the valve body 14. The valve seat 17 may accordingly be arranged perpendicular to an inner surface 18 of the housing 12 defining at least a portion of the inlet port 13. The valve seat 17 may alternatively be arranged at an incline with respect to the inner surface 18 defining the inlet port 13, thereby resulting in a conically shaped valve seat 17, as desired.

The valve case 20 is substantially cylindrical in shape and includes an end cap 24 and a sidewall 25. The end cap 24 is substantially planar in a direction transverse to an axial direction of the valve case 20 and has a substantially circular periphery 26. The sidewall 25 extends from the periphery 26 of the end cap 24 in a longitudinal direction of the valve case 20 and is arranged substantially perpendicular to the end cap 24. A first end 21 of the sidewall 25 spaced apart from the end cap 24 forms an annularly extending peripheral rim 23 at an open end of the case 20 for engaging the valve body 14. The first end 21 of the sidewall 25 is illustrated in FIG. 2 as including a first coupling feature 7 for engaging a complimentary second coupling feature 8 of the inlet port 14. For example, the sidewall 25 may include an internally threaded portion acting as the first coupling feature 7 adjacent the first end 21 of the sidewall 25 while an outer surface of the valve body 14 adjacent the valve seat 17 may include an externally threaded portion acting as the second coupling feature 8 configured for mating with the first coupling feature 7. Accordingly, the valve case 20 may be coupled to the valve body 14 by means of rotation of the first coupling feature 7 of the sidewall 25 relative to the second coupling feature 8 of the valve body 14, as desired. However, any method of coupling the valve case 20 to the valve body 14 may be used without departing from the scope of the present invention. For example, the valve case 20 may be coupled to the valve body 14 using any known coupling devices, fasteners, adhesives, friction welding, or aggressive joining methods, as desired.

Although the valve body 14 has thus far been shown and described as being formed independently of the housing 12 of the compressor, it should be understood by one skilled in the art that the valve body 14 may be adapted to form a portion of the housing 12 and especially a portion of the inlet port 13 thereof without departing from the scope of the present invention. For example, the portion of the housing 12 defining the inlet port 13 may be adapted to include the valve seat 17 at an end thereof in the absence of the separately formed valve body 14. The valve case 20 may therefore be adapted to be directly coupled to the portion of the housing 12 defining the valve seat 17 and the valve core 40 may be configured for direct engagement with the portion of the housing 12 defining the valve seat 17. Alternatively, the valve body 14 may be coupled to or otherwise disposed within the housing 12 of the compressor and the pipe or conduit 11 in fluid communication with the suction dampening device 10 may be directly coupled to valve body 14 in the absence of any form of intervening portion of the housing 12 such as the valve port 13. The suction dampening device 10 may accordingly be installed in any variety of different configurations without the altering the general operating principle of the suction dampening device 10, as described hereinafter in greater detail with reference to a method of operation of the suction dampening device 10.

A second end 22 of the sidewall 25 intersects the end cap 24 along at least a portion of the periphery 26 thereof. The sidewall 25 includes a plurality of lateral openings 27, 28 formed therein. The lateral openings 27, 28 may include at least one flow accommodating opening 27 and a lever accommodating opening 28. Each of the at least one flow accommodating openings 27 is suitable for allowing a flow of the refrigerant out of the valve case 20 in a direction transverse to the longitudinal direction thereof. The valve case 20 illustrated in FIGS. 1-7 is shown as including five of the flow accommodating openings 27 therein, wherein a first one of the flow accommodating openings 27 is formed diametrically opposed to the single lever accommodating opening 28. A first pair of the flow accommodating openings 27 is formed intermediate the one of the flow accommodating openings 27 and the lever accommodating opening 28 to one side of the valve case 20 while a second pair of the flow accommodating openings 27 is formed intermediate the one of the flow accommodating openings 27 and the lever accommodating opening 28 to a second opposing side of the valve case 20. However, alternative configurations of the flow accommodating openings 27 may be used without departing from the scope of the present invention.

The at least one flow accommodating opening 27 provides fluid communication between a hollow interior of the valve case 20 and an interior compartment of the variable displacement compressor such as the suction chamber of the variable displacement compressor. The at least one flow accommodating opening 27 may have a length extending longitudinally from the end cap 24 to a position spaced from the first end 21 of the sidewall 25 while also including a width extending in a circumferential direction of the sidewall 25. However, other configurations of the at least one flow accommodating opening 27 may be used without departing from the scope of the present invention.

The lever accommodating opening 28 similarly extends longitudinally from the end cap 24 to a position spaced from the first end 21 of the sidewall 25. The lever accommodating opening 28 also extends in a circumferential direction of the sidewall 25 and includes a width suitable for receiving a width of at least a portion of the lever 80 therein.

The end cap 24 includes at least one end opening 31, a first lever opening 34, and a second lever opening 35. The at least one end opening 31 may include a plurality of end openings 31 providing fluid communication between the hollow interior of the valve case 20 and a downstream interior compartment of the variable displacement compressor such as the suction chamber thereof. The valve case 20 is illustrated in FIGS. 1-3 as including five of the end openings 31, wherein each of the end openings 31 extends coextensively with one of the flow accommodating openings 27 at the periphery 26 of the end cap 24 to allow the refrigerant flowing through the valve case 20 to flow out of the valve case 20 in both a radially outward direction and an axial direction. Alternatively, the end openings 31 may be positioned independently of the positioning of the flow accommodating openings 27, as desired. Any configuration of the flow accommodating openings 27 and the end openings 31 may be used so long as the refrigerant flowing through the valve case 20 is able to freely exit the hollow interior of the valve case 20 to then flow towards the suction chamber 3 of the compressor 1.

The lever 80 includes a first lever arm 81 formed to a first side of an axis of rotation 85 thereof and a second lever arm 82 formed to a second side of the axis of rotation 85 thereof. The axis of rotation 85 of the lever 80 is formed by a pivot member 95 extending between and monolithically formed with respect to each of the lever 80 and the end cap 24 of the case 20. Accordingly, the embodiment of the suction dampening device 10 illustrated in FIGS. 1-7 includes the valve case 20 and the lever 80 being formed integrally in a single manufacturing process such as a molding process. The pivot member 95 may form a strip of material extending between the lever 80 and the end cap 24 having a substantially rectangular cross-sectional shape. The lever 80 is accordingly caused to rotate about the axis of rotation 85 thereof by a flexing of the material forming the pivot member 95. As such, the material used to form the valve case 20 and the lever 80 is selected to undergo repeated cycles of flexing of the pivot member 95 while avoiding failure thereof.

The end cap 24 may include a pair of tapered and inwardly extending projections 96 formed between and dividing the first lever opening 34 from the second lever opening 35. Each of the projections 96 narrows as each of the projections 96 extends in a radial inward direction toward a longitudinal axis of the lever 80. The projections 96 continue to narrow until the projections 96 transition into the pivot member 95, which includes a width substantially equal to a width of the narrow ends of each of the projections 96. The pivot member 95 extends from the projections 96 of the end cap 24 toward a bottom surface of the lever 80 in the axial direction of the valve core 40. Alternative configurations of the pivot member 95 may be used without departing from the scope of the present invention as long as the pivot member 95 is suitable for forming the axis of rotation 85 and allowing relative movement between the lever 80 and the end cap 24 of the valve case 20.

The first lever arm 81 includes an upper surface 86 defining a spring seat 84. The spring seat 84 may be a substantially annular surface configured to engage the spring element 60. The second lever arm 82 includes a radially extending portion 87 and an axially extending portion 88. The radially extending portion 87 extends radially outwardly from the pivot member 95 in a direction substantially parallel to the end cap 24 before transitioning into the axially extending portion 88 adjacent the lever accommodating opening 28 of the sidewall 25, wherein the axially extending portion 88 of the second lever arm 82 is received within the lever accommodating opening 28. A distal end of the axially extending portion 88 may be spaced from an end of the lever accommodating opening 28 adjacent the first end 21 of the sidewall 25 to allow for movement of the distal end in response to rotation of the lever 80 about the axis of rotation 85 thereof. The lever 80 may for example only limited to rotation through an angle between 0 and 5 degrees, as a non-limiting example. The second lever arm 82 may have a substantially cylindrical outer contour corresponding to the cylindrical contour of the sidewall 25 present to each side of the lever accommodating opening 28.

A first projection 94 extends from the first lever arm 81 into the first lever opening 34 and a second projection 98 extends from the second lever arm 82 into the second lever opening 35. The first projection 94 and the second projection 98 may each have an axially extending portion wherein an end of each of the projections 94, 98 is in substantial alignment with an outermost surface of the end cap 24. The projections 94, 98 may be configured to engage a surface 99 (shown in FIGS. 6 and 7) of the housing 12 adjacent the end cap 24 following a small degree of rotation of the lever 80, thereby limiting the degree of rotation of the lever 80 about the axis of rotation 85 thereof. The limiting of the rotation of the lever 80 ensures that the lever 80 is stabilized relative to the remainder of the suction dampening device 10 to prevent potential over-rotation and failure thereof.

The valve core 40 is substantially cylindrical in shape and extends from a first end 45 to a second end 46 thereof. A circumferentially extending inclined surface 42 is formed intermediate the first end 45 of the valve core 40 and an outer circumferential surface 44 of the valve core 40 arranged perpendicular to the first end 45 thereof. The inclined surface 42 forms a conical surface configured to engage the valve seat 17 of the valve body 14. The valve core 40 may further include at least one radially inwardly extending indentation 48 formed therein. The valve core 40 shown includes five of the indentations 48 spaced apart about a periphery valve core 40 while extending axially through at least a portion of each of the inclined surface 42 and the outer circumferential surface 44 of the valve core 40. The five indentations 48 are spaced about the periphery of the valve core 40 to correspond to the positions of both of the flow accommodating openings 27 of the sidewall 25 and the end openings 31 of the end cap 24. One of the indentations 48 formed in the valve core 40 opposite a portion of the valve core 40 engaging the second lever arm 82 may extend radially inwardly to an extent that the hollow interior of the valve body 14 remains in fluid communication with the hollow interior of the valve case 20 even when the first end 45 of the valve core 40 engages the valve seat 17 of the valve body 14. In other embodiments, each of the indentations 48 allows for flow around the outer circumferential surface 44 of the valve core 40 only when the first end 45 of the valve core 40 has been disengaged from the valve seat 17. The valve core 40 may alternatively be formed in the absence of the indentations 48, as desired. The indentations 48 aid in forming a preferred flow path of the refrigerant as the refrigerant flows both into and out of the hollow interior of the valve case 20 during a period of disengagement of the valve core 40 from the valve seat 17.

The valve core 40 is slidably disposed within the sidewall 25 of the valve case 20. More specifically, at least a portion of the outer circumferential surface 44 of the valve core 40 slidably engages an inner circumferential surface 29 of the sidewall 25. Due to the manner in which the second lever arm 82 extends into the lever accommodating opening 28 of the sidewall 25, the outer circumferential surface 44 of the valve core 40 further slidably engages an inner surface 91 of the axially extending portion 88 of the second lever arm 82. The inner surface 91 of the axially extending portion 88 may include a substantially cylindrical contour matching that of the sidewall 25 and the valve core 40 to each side of the second lever arm 82, as desired.

Figure 4:
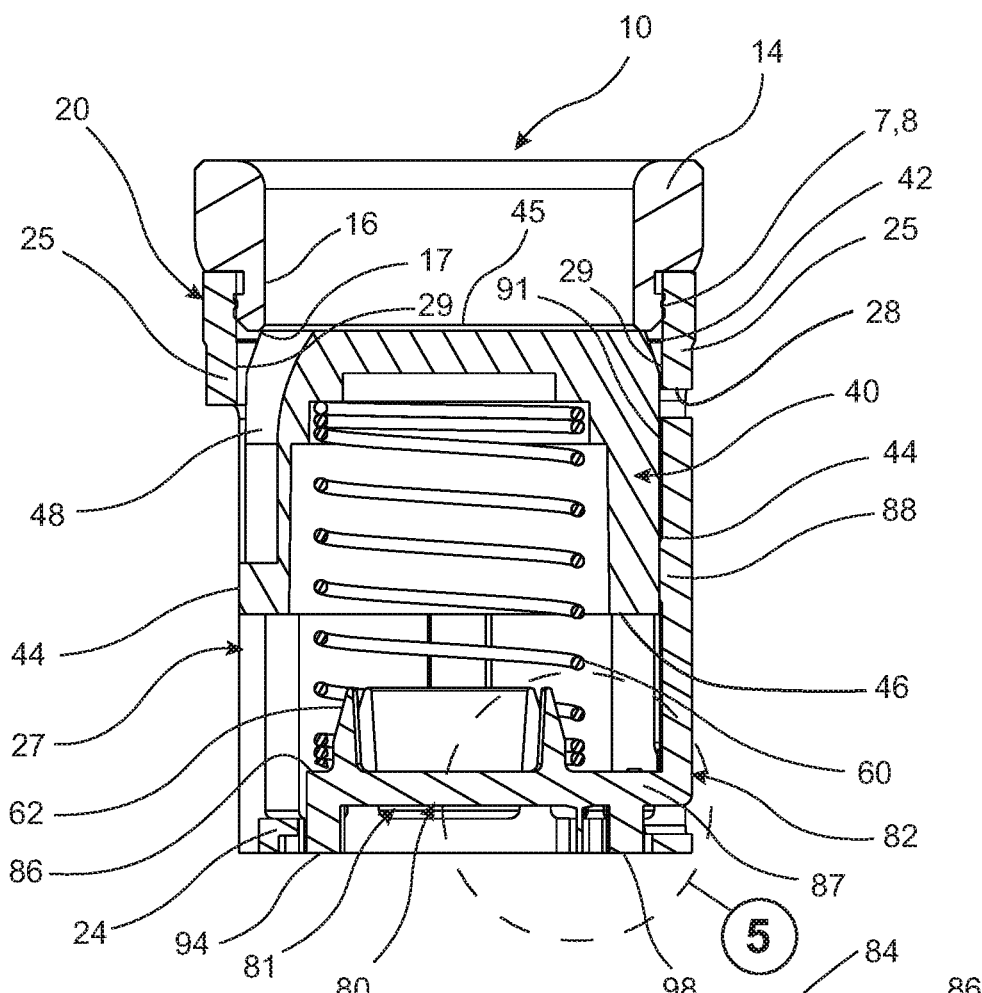
FIG. 4 is a cross-sectional side elevational view of the suction dampening device of FIG. 1.
Figure 5:
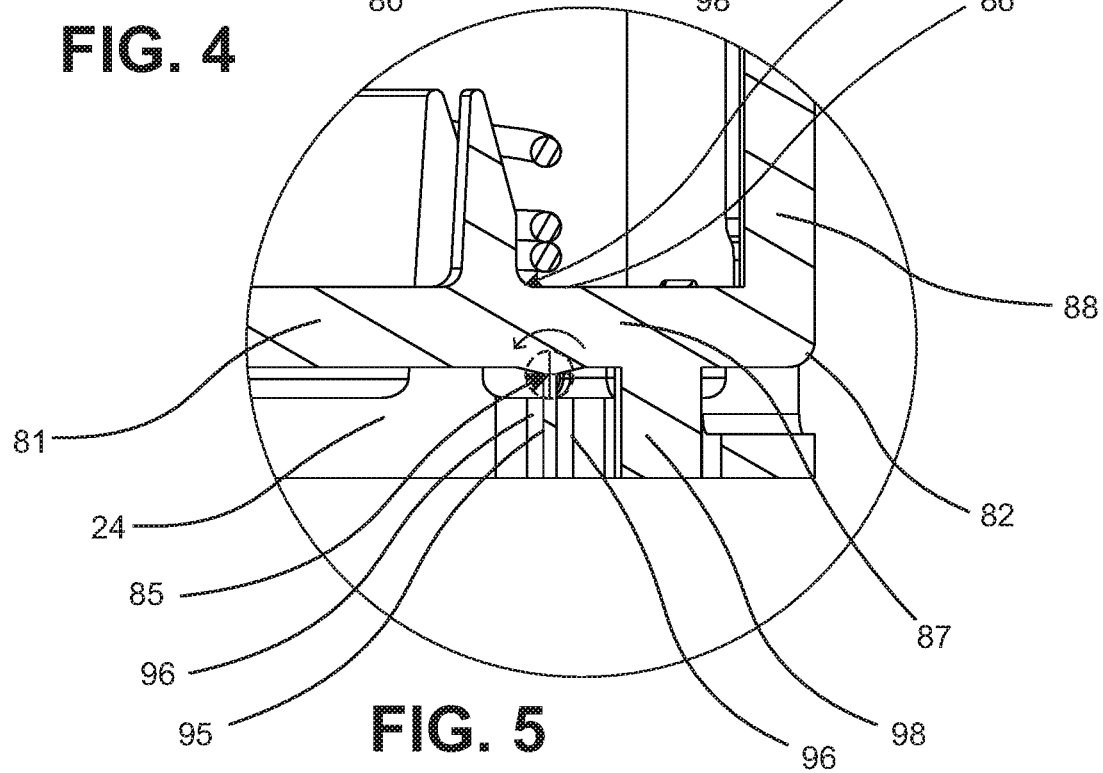
FIG. 5 is an enlarged fragmentary cross-sectional side elevational view of a portion of the suction dampening device illustrated within circle 5 of FIG. 4.

The spring element 60 extends between the spring seat 84 of the first lever arm 81 and the valve core 40. The spring element 60 is configured to be pre-compressed in a manner wherein the spring element 60 normally urges the valve core 40 in a direction towards the valve body 14 while also urging the first lever arm 81 in a direction towards the end cap 24 of the valve case 20. As shown in FIGS. 4 and 5, the axis of rotation 85 of the lever 80 is disposed in alignment with an end of the spring seat 84 in a manner wherein the spring element 60 applies a force substantially exclusively to the first lever arm 81. However, it should be understood that the axis of rotation 85 of the lever 80 may be disposed at any position wherein the force and resulting moment applied to the first lever arm 81 by the spring element 60 is greater than the force and resulting moment applied by the spring element 60 to the second lever arm 82.

The spring element 60 is shown as a typical helically wound compression spring, but it should be understood that any form of resilient member providing a force between the valve core 40 and the lever 80 may be used without departing from the scope of the present invention. The spring element 60 is further shown as received over a substantially cylindrical sleeve 62 axially extending from the spring seat 88 of the lever 80, wherein the sleeve 62 is configured to maintain a position of the spring element 60 relative to the spring seat 88. Alternative configurations of the spring element 60 and the lever 80 may also be used without departing from the scope of the present invention so long as the spring element 60 provides a desired force to the first lever arm 81 in response to compression of the spring element 60.

In use, the variable displacement compressor is placed in an operating state creating a suction pressure within the suction chamber 3 of the compressor 1 and hence the hollow interior of the valve case 20. It is understood that the suction pressure is lower than a pressure of the refrigerant entering the valve body 14 from the conduit 11. The second end 46 of the valve core 40 is exposed to the suction pressure within the hollow interior of the valve case 20 while the first end 45 of the valve core 40 is exposed to the refrigerant upstream of the valve case 20 within the valve body 14. As described hereinabove, the spring element 60 is configured to normally urge the first lever arm 81 of the lever 80 in a direction towards the end cap 24 of the valve case 20 while also applying a force to the valve core 40 in a direction away from the end cap 24 and towards the valve seat 17.

FIG. 6 illustrates the suction dampening device 10 when the valve core 40 is in engagement with the valve seat 17 of the valve body 14, which may generally be referred to as a closed operating state of the suction dampening device 10. The force applied by the spring element 60 to the first lever arm 81 causes the lever 80 to attempt to pivot about the axis of rotation 85 thereof, thereby generating torque in the lever 80. The torque generated by the axially directed force of the spring element 60 applied to the first lever arm 81 is in turn delivered to the axially extending portion 88 of the second lever arm 82, which includes the inner surface 91 thereof in frictional engagement with the outer circumferential surface 44 of the valve core 40. The axially extending portion 88 of the second lever arm 82 in turn applies a force to the outer circumferential surface 44 of the valve core 40, wherein the force applied to the valve core 40 extends at least partially in a direction perpendicular to the axial direction the valve core 40 and the valve case 20. The perpendicular force causes a frictional force to develop between the outer circumferential surface 44 of the valve core 40 and the inner surface 91 of the axially extending portion 88 of the second lever arm 82.

The perpendicular force formed between the core 40 and the second lever arm 82 also causes the valve core 40 to engage the inner circumferential surface 29 of the sidewall 25 of the case 20 opposite the lever accommodating opening 28 to cause a frictional force to develop between the outer circumferential surface 44 of the valve core 40 and the inner circumferential surface 29 of the sidewall 25. The portion of the inner circumferential surface 29 in engagement with the valve core 40 may be formed intermediate the one of the lateral openings 27 and the first end 21 of the sidewall 25, for example.

If the pressure of the refrigerant in the valve body 14 is increased to a value wherein the force applied to the first end 45 of the valve core 40 exceeds the force applied to the second end 46 of the valve core 40 by the spring element 60 and the suction pressure, the valve core 40 is caused to move in an axial direction thereof toward the end cap 24 of the valve case 20, as illustrated in FIG. 7. The axial movement of the valve core 40 causes the inclined surface 42 of the valve core 40 to disengage the valve seat 17, thereby placing the suction dampening device 10 into an open operating state. The continued motion of the valve core 40 toward the end cap 24 allows the refrigerant to flow between the outer circumferential surface 44 of the valve core 40 and the inner circumferential surface 29 of the sidewall 25 when entering the hollow interior of the valve case 20. As explained hereinabove, the indentations 48 formed in the valve core 40 may cause at least a portion of the refrigerant flowing past the valve core 40 to first be directed through the indentations 48 as the valve core 40 initially disengages the valve seat 17. The refrigerant entering the hollow interior is then allowed to flow through any of the lateral flow accommodating openings 27 and/or the end openings 31 towards the suction chamber 3 of the variable displacement compressor, as desired.

The frictional forces present between the valve core 40 and each of the sidewall 25 and the second lever arm 82 act to dampen any undesired vibrations or oscillations that may develop within the spring element 60 when excited by the flow of the refrigerant though the suction dampening device 10. Additionally, as the valve core 40 is caused to move closer to the end cap 24, the force applied by the spring element 60 to the spring seat 84 is actually increased due to the continued compression of the spring element 60, thereby increasing the dampening effect of the lever 80. The suction dampening device 10 is accordingly able to dampen the vibrations of the spring element 60 regardless of an operating mode or speed of the compressor 1 due to the compression of the spring element 60 being proportional to the frictional forces present between the valve core 40 and each of the sidewall 25 and the second lever arm 82.

Figure 8:
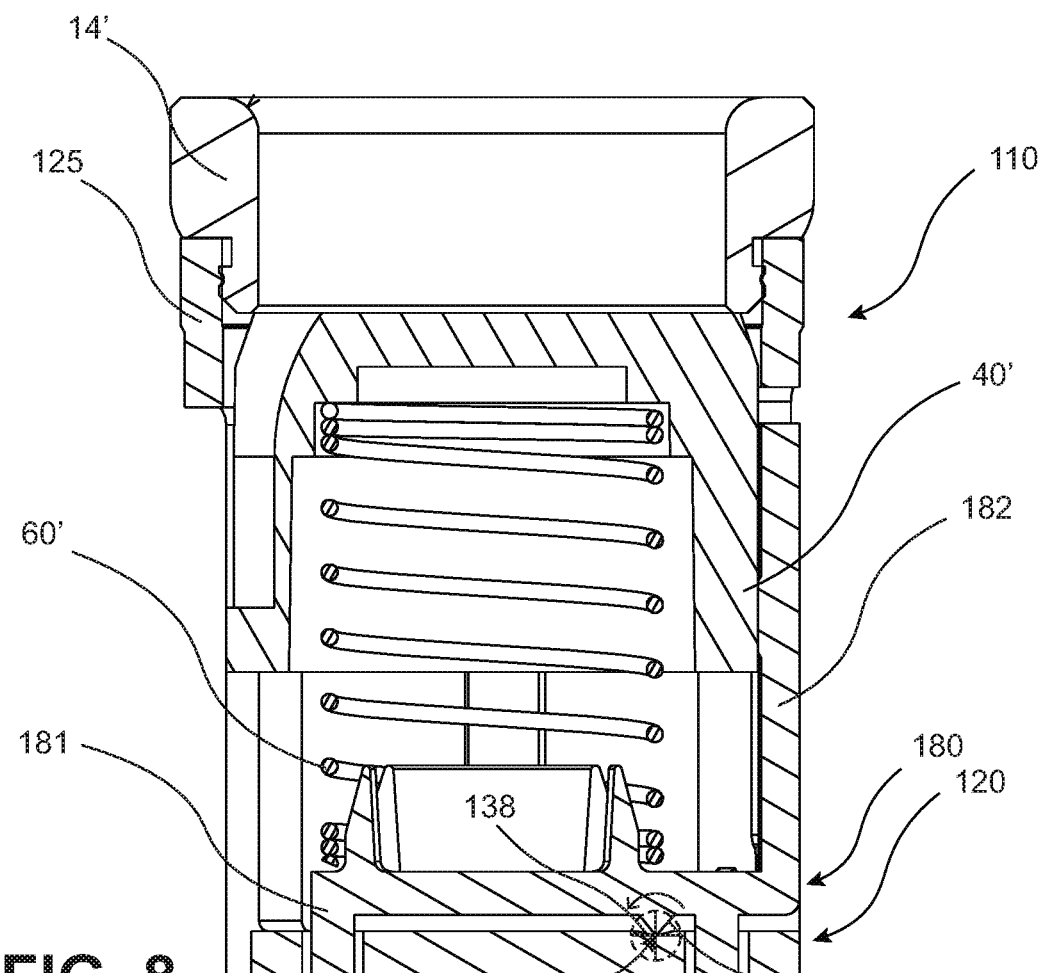
FIG. 8 is a cross-sectional side elevational view of a suction dampening device according to another embodiment of the invention.
Figure 9:
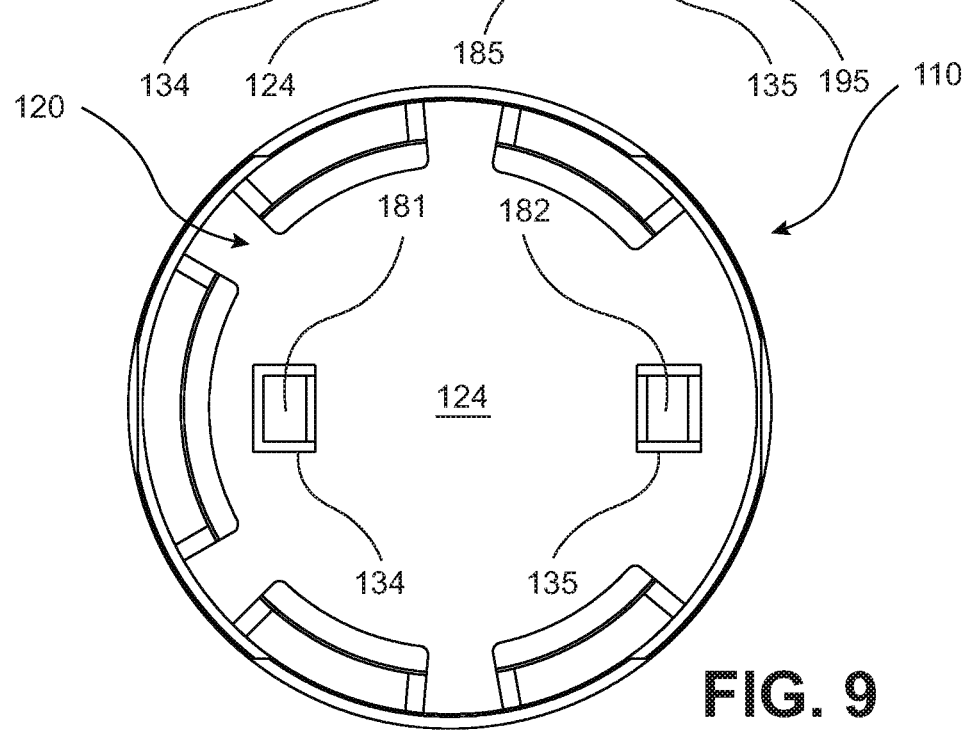
FIG. 9 is a bottom plan view of the suction dampening device of FIG. 8.

FIGS. 8 and 9 illustrate a suction dampening device 110 according to another embodiment of the invention. Structure similar to that illustrated in FIGS. 1-7 includes the same reference numeral and a prime (') symbol for clarity. The suction dampening device 110 is similarly configured for installation in the compressor 1. The suction dampening device 110 includes the same general construction as the suction dampening device 10 illustrated in FIGS. 6 and 7, including utilizing a substantially identical valve body 14', valve core 40', and spring element 60'. However, in contrast to the suction dampening device 10 having a monolithically formed valve case 20 and lever 80, the suction dampening device 110 includes a lever 180 separately formed from a valve case 120.

The valve case 120 includes an end cap 124 and a sidewall 125 extending longitudinally therefrom. The end cap 124 of the valve case 120 further includes a first lever opening 134 for receiving a portion of the first lever arm 181 and a second lever opening 135 for receiving a portion of the second lever arm 182, as shown in FIG. 9. The end cap 124 further includes a depression 138 formed in a surface thereof in facing relationship with the lever 180. The lever 180 is substantially identical to the lever 80 and includes a first lever arm 181 engaging the spring element 60' and a second lever arm 182 engaging the valve core 40'. However, in contrast to the lever 80 of FIGS. 1-7, an axis of rotation 185 of the lever 180 is formed at an intersection of a pivot arm 195 extending from the lever 80 and the depression 138 formed in the end cap 124.

The suction dampening device 110 operates in the same manner as the suction dampening device 10. The valve core 40' is configured to move in an axial direction thereof to disengage the valve body 14' in response to a pressure difference between the refrigerant within the valve body 14' and the refrigerant within the valve case 120 overcoming the force of the pre-compressed spring element 60' acting on the valve core 40'. The spring element 60' applies a force to the first lever arm 181 of the lever 180 at a distance from the axis of rotation 185 thereof to form torque within the lever 180. The torque is transferred to the second lever arm 182 to cause a frictional force to exist between the second lever arm 182 and the valve core 40', thereby dampening motion of the valve core 40' in the axial direction thereof.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A suction dampening device for a compressor comprising:
   a valve case including a circumferentially extending sidewall having an inner surface;
   a valve core having an outer surface directly slidably engaging the inner surface of the sidewall of the valve case;

a lever including a first lever arm and a second lever arm formed on opposing sides of an axis of rotation thereof, at least a portion of the second lever arm frictionally engaging the outer surface of the valve core; and a spring element disposed between the first lever arm and the valve core, the spring element engaging the first lever arm and not the second lever arm, the spring element configured to urge the first lever arm in an axial direction of the valve case to cause the at least a portion of the second lever arm to press against the outer surface of the valve core.

2. The suction dampening device of claim 1, wherein the second lever arm is disposed within an opening formed in the sidewall of the valve case.

3. The suction dampening device of claim 1, wherein the second lever arm includes a radially extending portion and an axially extending portion, the radially extending portion disposed between the axis of rotation of the lever and the axially extending portion.

4. The suction dampening device of claim 3, wherein the axially extending portion of the second lever arm forms the at least a portion of the second lever arm frictionally engaging the outer surface of the valve core.

5. The suction dampening device of claim 1, wherein a force applied to the outer surface of the valve core by the pressing of the at least a portion of the second lever arm against the outer surface of the valve core is applied in a direction transverse to the axial direction of the valve case.

6. The suction dampening device of claim 1, wherein the at least a portion of the second lever arm applies a force to a first side of the outer surface of the valve core to cause a second side of the outer surface of the valve core to engage the inner surface of the sidewall, the second side of the outer surface opposing the first side of the outer surface.

7. The suction dampening device of claim 1, wherein the lever is formed separately from the valve case.

8. The suction dampening device of claim 7, wherein the axis of rotation of the lever is disposed at an intersection of a pivot arm projecting from the lever and a portion of the valve case.

9. The suction dampening device of claim 8, wherein the portion of the valve case is an end cap of the valve case formed at an end of the sidewall thereof.

10. The suction dampening device of claim 1, wherein the lever is formed monolithically with the valve case.

11. The suction dampening device of claim 10, wherein the axis of rotation of the lever extends through a strip of a material forming a portion of each of the valve case and the lever.

12. The suction dampening device of claim 11, wherein the strip of material extends from an end cap of the valve case to an intersection of the first lever arm and the second lever arm.

13. The suction dampening device of claim 1, wherein the compressor includes a suction chamber having a suction pressure, wherein the valve case includes at least one opening formed therein, wherein the at least one opening provides fluid communication between the valve case and the suction chamber of the compressor.

14. The suction dampening device of claim 13, further comprising a valve body including a valve seat configured to engage an end of the valve core opposite the spring element, the valve body in fluid communication with a first fluid having a first pressure.

15. The suction dampening device of claim 14, wherein the valve core disengages the valve seat of the valve body in response to a force applied to the valve core by the first pressure exceeding a force applied to the valve core by the suction pressure and the spring element.

16. A compressor comprising:
a housing including an inlet for receiving a flow of a refrigerant and a suction chamber disposed downstream of the inlet with respect to a flow of the refrigerant, the inlet exposed to a first pressure and the suction chamber exposed to a suction pressure;

a valve case including a circumferentially extending sidewall having an inner surface;

a valve core having an outer surface directly slidably engaging the inner surface of the sidewall of the valve case, a first end of the valve core exposed to the first pressure and a second end of the valve core exposed to the suction pressure;

a lever including a first lever arm and a second lever arm formed on opposing sides of an axis of rotation thereof, at least a portion of the second lever arm engaging the outer surface of the valve core; and a spring element disposed between the first lever arm and the valve core, the spring element engaging the first lever arm and not the second lever arm, the spring element configured to urge the first lever arm in an axial direction of the valve case to cause the at least a portion of the second lever arm to press against the outer surface of the valve core.

17. The compressor according to claim 16, further including a valve body including a valve seat configured to engage the first end of the valve core.

18. The compressor according to claim 17, wherein the first end of the valve core disengages the valve seat of the valve body in response to a force applied to the valve core by the first pressure exceeding a force applied to the valve core by the suction pressure and the spring element.

19. The compressor according to claim 16, wherein the lever is formed monolithically with the valve case and wherein the axis of rotation of the lever extends through a strip of a material forming a portion of each of the valve case and the lever.

20. The compressor according to claim 16, wherein the axis of rotation of the lever is disposed at an intersection of a pivot arm projecting from the lever and an end cap of the valve case formed at an end of the sidewall thereof.

* * * * *